United States Patent [19]

Ono

[11] 4,299,437
[45] Nov. 10, 1981

[54] COHERENT BEAM SCANNER HAVING A PLANAR HOLOGRAM ILLUMINATED BY A CONVERGENT OR DIVERGENT BEAM

[75] Inventor: Yuzo Ono, Tokyo, Japan

[73] Assignee: Nippon Electric Co., Ltd., Tokyo, Japan

[21] Appl. No.: 9,720

[22] Filed: Feb. 5, 1979

[30] Foreign Application Priority Data

Feb. 3, 1978 [JP] Japan .................................. 53/11711

[51] Int. Cl.³ .............................................. G02B 27/17
[52] U.S. Cl. ..................................... 350/3.71; 350/6.2
[58] Field of Search ................... 350/3.71, 3.83, 3.70, 350/3.72, 6.2

[56] References Cited

U.S. PATENT DOCUMENTS

| | | | |
|---|---|---|---|
| 3,578,845 | 5/1971 | Brooks et al. ...................... | 350/3.72 |
| 3,795,768 | 3/1974 | Locke .................................. | 350/3.71 |
| 4,073,566 | 2/1978 | Noguchi ............................. | 350/3.71 |
| 4,113,343 | 9/1978 | Pole et al. .......................... | 350/3.71 |
| 4,121,882 | 10/1978 | White ................................. | 350/3.71 |

FOREIGN PATENT DOCUMENTS 54-5448 1/1979 Japan .................................. 350/3.71

OTHER PUBLICATIONS

Pole et al., "Holographic Laser Beam Deflector", App. Opt., vol. 14, No. 4, 4-75, pp. 976-980.
Cindrich, "Image Scanning by Rotation of a Hologram", Applied Optics, vol. 6, No. 9, Sep. 1967, pp. 1531-1534.
Lee, "Holographic Grating Scanners with Aberration Corrections", Applied Optics, 16(5), May 1977, pp. 1392-1399.

Primary Examiner—Alfred E. Smith
Assistant Examiner—Carolyn E. Fields
Attorney, Agent, or Firm—Sughrue, Mion, Zinn, Macpeak & Seas

[57] ABSTRACT

A coherent beam scanner provides a scan along a straight line by using a linearly moving planar hologram illuminated with a convergent or divergent beam. The hologram is formed by a first beam divergent from a first point on one side of the hologram and a second beam that is coherent with the first beam and convergent at a second point on the other side of the hologram; preferably, the beam axes of the first and second beams are made to form a predetermined acute angle with each other.

4 Claims, 4 Drawing Figures

COHERENT BEAM SCANNER HAVING A PLANAR HOLOGRAM ILLUMINATED BY A CONVERGENT OR DIVERGENT BEAM

BACKGROUND OF THE INVENTION

This invention relates to a coherent beam scanner for use in combination with at least one hologram.

A laser beam is usually used as a coherent beam in a coherent beam scanner, which will therefore be referred to often as a laser beam scanner hereunder. A laser beam scanner causes a laser beam to scan an output plane as a small scan spot with a hologram used as a diffraction grating for diffracting a laser beam incident thereon and with the hologram linearly moved so as to vary the angle of deflection or scan of the diffracted laser beam as will later be described with reference to one of several figures in the accompanying drawings. A sophisticated hologram for use in a laser beam scanner is defective because of unavoidable aberrations in the diffracted laser beam. It has thus been impossible to achieve a sufficiently small scan spot over a wide angle of scan. A phase plate for correcting the aberrations is described in an article contributed by Wai-Hon Lee to "Applied Optics," Volume 16, No. 5 (May, 1977), pages 1392–1399, under the title of "Holographic Grating Scanners with Aberration Corrections." The phase plate is necessary only during manufacture of the holograms. It is, however, not easy to manufacture the phase plate with a precision high enough to correct the aberrations to a satisfactory extent.

SUMMARY OF THE INVENTION

It is therefore an object of the present invention to provide a coherent beam scanner for use with at least one hologram, whereby it is possible to achieve a sufficiently small scan spot over a wide angle of scan.

It is another object of this invention to provide a coherent beam scanner of the type described, for which it is unnecessary to use a phase plate during manufacture of the holograms.

According to this invention, a coherent beam scanner uses a hologram comprising a hologram recording medium having a surface recording a fringe pattern substantially produced by interference on the above-mentioned surface of a first beam divergent substantially from a first point with a second beam that is coherent with the first beam and convergent at a second point. The first and the second points should be on the respective sides of the above-mentioned surface.

According to this invention, the coherent beam scanner is provided for use in combination with at least one hologram set forth in the next preceding paragraph, which comprises a coherent beam source haing a beam axis, means for carrying the above-mentioned at least one hologram and for moving the carried hologram relative to the beam axis to illuminate the carried hologram with the coherent beam.

Also disclosed is a device for manufacturing the hologram specified in the preceding paragraph and comprises means for holding the hologram recording medium of the hologram being manufactured and a first and a second source on one side of the holding means. The first and the second sources should be for directing the above-mentioned first and second beams, respectively, to the hologram recording medium held by the holding means.

DESCRIPTION OF THE PREFERRED EMBODIMENTS

At the outset, a hologram for use in a laser beam scanner will be discussed in general in order to facilitate an understanding of the present invention. In the manner known in the art, the hologram has a pattern of a large number of interference fringes, herein called a phase pattern for brevity, on a surface thereof. It is already theoretically known, when orthogonal x-y axes are considered on the surface, that a theoretical or "geometric" phase pattern recorded on the surface for a laser beam of a predetermined wavelength $\lambda$ should follow a theoretical phase function $\phi(x, y)$ given by:

$$\phi(x, y) = \pi r^2/(\lambda F), \tag{1}$$

where $r^2$ represents $x^2 + y^2$ and F, a focal length of the hologram. The phase pattern comprises n-th order interference fringes along circles where the theoretical phase function $\phi(x, y)$ is equal to $2n\pi (n = 1, 2, 3, \ldots)$. Radii $r_n$ of the respective interference fringes are:

$$r_n = (2\lambda F n)^{\frac{1}{2}}. \tag{2}$$

An excellent arrangement for optically manufacturing a conventional hologram, known as a "point-source hologram" or an "interference zone plate," having a phase pattern approximately defined by Equation (1) is to subject a hologram recording to a laser beam having a divergent spherical wavefront and a collimated laser beam that is coherent with the divergent beam. The phase pattern thereby recorded on the holographic medium follows an approximate phase function $\phi'(x, y)$ given by:

$$\phi'(x, y) = 2\pi[(r^2 + F^2)^{\frac{1}{2}} - F]/\lambda. \tag{3}$$

Radii $r_n'$ of the n-th order interference fringes of the phase pattern defined by Equation (3) are:

$$r_n = [2\lambda F n - (n\lambda)^2]^{\frac{1}{2}}. \tag{4}$$

It is understood from Equations (2) and (4) that the point-source hologram may be used as a hologram having the theoretical phase pattern when the order n of interference satisfies:

$$F \gg n\lambda/2. \tag{5}$$

Inequality (5) shows that aberrations become more serious as the point-source hologram is linearly moved to produce the diffracted beam from a peripheral portion thereof. As a result of the aberrations, the scan spot is elongated in the direction of scan to thereby deteriorate resolution. This has rendered it impossible to provide a laser beam scanner operable in a wide angle of scan.

A phase plate mentioned in the preamble of the instant specification is excellent in correcting the aberrations. However the phase plate is a hologram that bears a digital phase pattern synthesized by the use of an electronic digital computer to be recorded thereon. It is therefore not easy to manufacture the phase plate with high precision.

Figure 1:
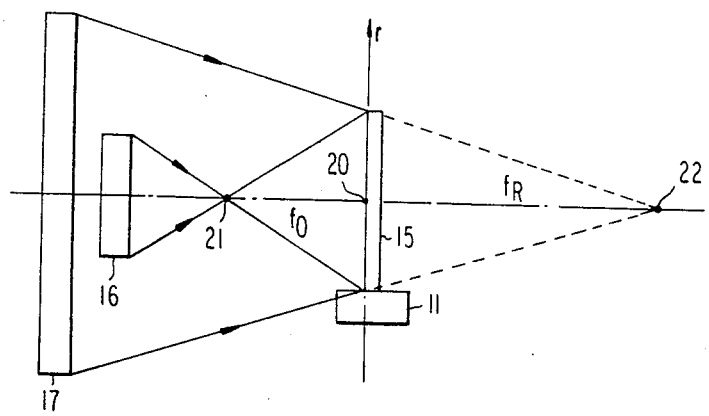
FIG. 1 is a schematic top view of a device for manufacturing a hologram for use in a coherent beam scanner according to an embodiment of this invention.

Referring now to FIG. 1, a device for manufacturing a hologram for use in a laser beam scanner according to an embodiment of this invention comprises a holder 11 for holding a hologram recording medium 15 having a pair of principal surfaces. The device further comprises a first source of a first or object beam and a second source of a second or reference beam, both on a preselected side of a predetermined one of the principal surfaces, as symbolically depicted at 16 and 17, respectively. The first beam has a first beam axis normal to the predetermined principal surface at a prescribed point 20 and incident on the predetermined principal surface as a beam divergent from a first point 21. The second beam is coherent with the first beam and has a second beam axis that is normal to the predetermined principal surface also at the prescribed point 20. The second beam is incident on the predetermined principal surface as a beam convergent at a second point 22. The first and the second points 21 and 22 are on the preselected side and the other side of the predetermined principal surface, respectively. It is readily possible to provide the first and the second sources 16 and 17 by splitting a coherent beam into two by a beam splitter (not shown). Inasmuch as a laser beam is generally used as the coherent beam, a system comprising the beam splitter and the arrangements for providing the first and the second beams may be called an optical system. The hologram recording medium 15 may be a photographic plate or film, in which case the predetermined principal surface should be that surface of the photographic plate or film which has a photosensitive layer. As a result of the interference of the first beam with the second beam, a phase pattern is recorded on the predetermined principal surface.

Further referring to FIG. 1, the x-y axes mentioned hereinabove are considered on the predetermined principal surface with the origin placed at the prescribed point 20. The phase pattern recorded on a hologram is defined by a noval phase function $\phi''(x, y)$ given by:

$$\phi''(x, y) = 2\pi([(r^2 + f_O^2)^{\frac{1}{2}} - f_O] \quad (6)$$
$$+ [(r^2 + f_R^2)^{\frac{1}{2}} - f_R])/\lambda,$$

where $f_O$ and $f_R$ represent the distances from the predetermined principal surface to the first and the second points 21 and 22, respectively. The prescribed point 20 becomes the center of the interference fringes or of the hologram. The focal length of the novel hologram is given by:

$$1/F = 1/f_O + 1/f_r. \quad (7)$$

Equation (6) is simplified into $$\phi''(x, y) = 4\pi[(r^2 + 4F^2)^{\frac{1}{2}} - 2F]/\lambda. \quad (8)$$

when $f_O$ and $f_R$ are rendered equal to each other and, according to Equation (7), to 2F. Radii $r_n''$ of the interference fringes are obtained from Equation (8) as:

$$r_n'' = [2\lambda Fn + (n\lambda/2)^2]^{\frac{1}{2}}. \quad (9)$$

Comparison of Equation (9) with Equation (2) shows that the phase pattern defined by Equation (8) is equivalent to the theoretical phase pattern when:

$$F >> n\lambda/8. \quad (10)$$

It is now understood that the same degree of approximation is insured when the order n of interference is four times as great in Inequality (10) as in Inequality (5). In other words, the aberations resulting from the novel hologram reach those resulting from the point-source hologram when the radius or diameter of the novel hologram is about twice as long as that of the point-source hologram.

A hologram for use in a laser beam scanner is generally rectangular in outline. In the laser beam scanner, the hologram is linearly moved along the length. A directly transmitted beam from the hologram is therefore eliminated when a laser beam is incident on the hologram along a beam axis that is inclined widthwise of the hologram from the normal thereto. The hologram is manufactured by the use of a device similar to that described in conjunction with FIG. 1 except that the first and the second beam axes are made to form a predetermined acute angle with each other on a plane normal to the hologram recording medium 15. More specifically, one or both of the first and the second beam axes may form an angle with the normal to the predetermined principal surface.

Figure 2:
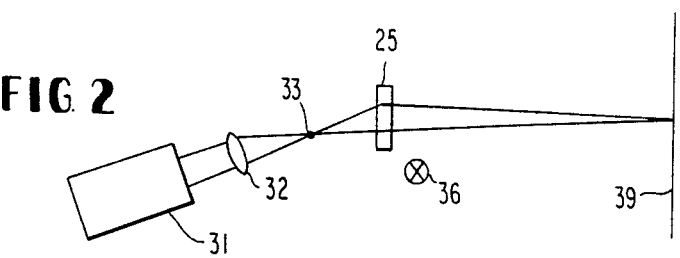
FIG. 2 is the schematic side view of a coherent beam scanner mentioned in connection with FIG. 1.

Referring to FIG. 2, a laser beam scanner according to an embodiment of this invention is for use in combination with a hologram 25 described in the preceding paragraph. The hologram 25 is, for example, 75 mm long and 5 mm wide. One of the 5-mm wide ends is depicted to show the hologram 25. The laser beam scanner comprises a source 31 of a laser beam, a beam converging system 32 exemplified by a single lens for making the beam converge at a point 33 of convergence and thereafter diverge into a divergent beam that is incident on a limited area of the predetermined principal surface of the hologram 25 along an axis of illumination included in the plane of the figure, a mechanical device symbolized at 36 for carrying the hologram 25 and for moving the same parallel to the length thereof, namely, perpendicular to the figure, and an output plane 39 for projecting an output laser beam diffracted thereto from the hologram 25. The axis of illumination is inclined to form a preselected acute angle with a normal to the hologram 25. The preselected angle need not be equal to the predetermined acute angle. As a result of the first-order diffraction of the laser beam incident on the hologram 25, the output laser beam forms a spot corresponding on the output plane 39 to the limited area. It is possible to understand the spot to be an image of the point 33 of convergence. The spot scans the output plane 39 perpendicularly of the figure as the limited area is moved relative to the axis of illumination.

Figure 3:
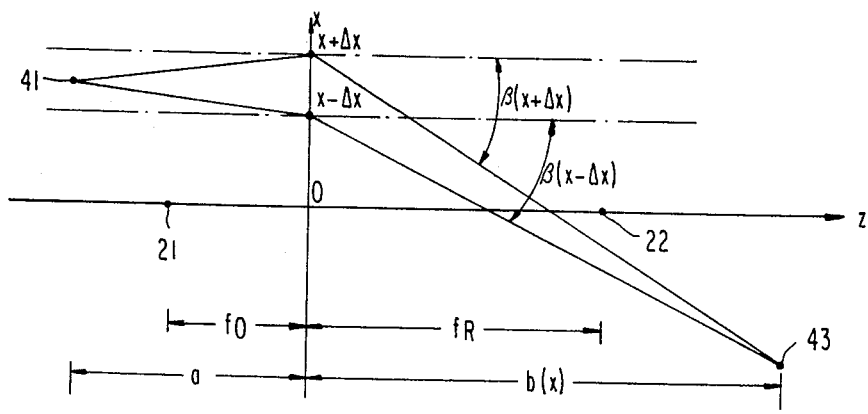
FIG. 3 is a schematic top view of a coherent beam scanner according to this invention and FIG. 4 shows image distances of two examples of the holograms for use in a laser beam scanner according to this invention in comparison with an image distance of a conventional hologram.

Turning to FIG. 3, a laser beam scanner illustrated therein is for use in combination with a rectangular hologram situated along the x-axis with the center thereof placed at the origin O. The scanner comprises a point source of a laser beam having a beam axis normal to the hologram. A z-axis is extended from the origin O towards the output plane (not shown). Points 21 and 22 show, merely for convenience of reference, the first and the second points 21 and 22 described with reference to FIG. 1. Let it be presumed that the point source is moved relative to the hologram to a source point 41 to illuminate a limited area of the hologram with the laser beam. The source point 41 is spaced from the hologram by an object distance a. The beam axis intersects the hologram at a point x. The image of the source point 41 is on the output plane at an image point 43. The image distance b(x) is given by:

$$b(x) = 2\Delta x / [\tan\beta(x + \Delta x) - \tan\beta(x - \Delta x)], \quad (11)$$

where $\Delta x$ represents an increment of the abscissa from the point x of intersection for two points $(x \pm \Delta x)$ within the limited area and $\beta(x \pm \Delta x)$, angles of deflection formed by straight lines passing through the image point 43 and the two points $(x \pm \Delta x)$ with a normal to the hologram. On the other hand, equations:

$$\sin(\text{Tan}^{-1}[(x \pm \Delta x)/f_R]) + \sin(\text{Tan}^{-1}[(x \pm \Delta x)/f_O]) \quad (12)$$
$$= \sin(\text{Tan}^{-1}[\pm \Delta x/a]) + \sin\beta(x \pm \Delta x)$$

result from the relation between the angles of diffraction for a diffraction grating. From Equations (11) and (12), the image distance b(x) is given as a function of the abscissa x of the point of intersection or of the angle $\beta(x)$ of deflection.

Figure 4:
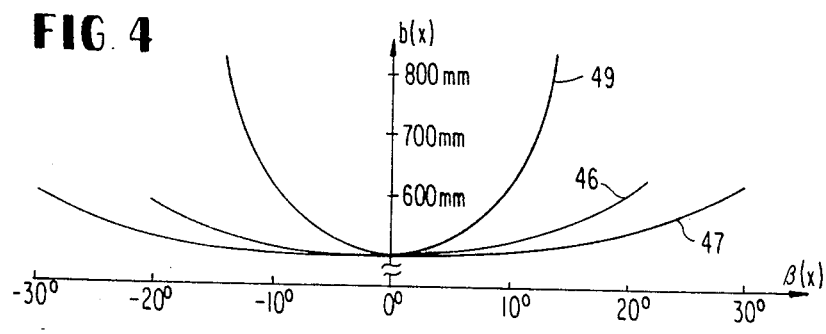

Referring finally to FIG. 4, image distances b(x) are calculated for a few holograms with 125 mm, 100 mm, and 1 mm given as the object distance a, the focal length F, and the increment $\Delta x$, respectively. Two curves 46 and 47 show the image distances b(x) versus the deflection angle $\beta(x)$ for those holograms according to this invention for which $f_O$ is rendered equal to 150 mm and 200 mm, respectively. Inasmuch as the focal length F is 100 mm for the both holograms, $f_R$ is equal to 300 mm and 200 mm, respectively. Another curve 49 shows the image distance b(x) for a point-source hologram. In each case, b(0) is equal to 500 mm. When a tolerance of 10 percent is allowed for the image distance b(x), the allowable deflection angles $\beta(x)$ are ±16.7°, ±23.5°, and ±6.7° for the curves 46, 47, and 49, respectively. It is appreciated that the novel hologram used in a laser beam scanner according to this invention is operable within an angle of deflection $\beta(x)$ which is about 3.5 times as wide as that allowable for the point-source hologram.

While this invention has thus far been described in specific conjuction with a few preferred embodiments thereof, it is now possible for those skilled in the art to put this invention into effect in various other ways. For example, it is possible to illuminate a hologram with a convergent or a collimated beam in a coherent beam scanner according to this invention. As is the case with a conventional coherent beam scanner, it is possible to substitute for the hologram 25 a plurality of holograms bearing respective phase patterns congruent to one another and wrapped around a drum to form a combination of holograms with the one-dimensional movement of the holograms carried out by rotation of the drum round an axis parallel to both the plane of the figure and the combined holograms. It is also possible to use such holograms with the holograms attached to a disk rotatable round an axis parallel to the figure and perpendicular to the combined holograms. In a device for manufacturing a hologram, the second beam need not actually reach the second point 22.

What is claimed is:

1. A coherent beam scanner for use in combination with a hologram comprising a hologram recording medium having a planar surface on which a fringe pattern is recorded, said fringe pattern being produced by interference on said surface of a first coherent beam divergent substantially from a first point with a second coherent beam that is coherent with said first coherent beam and convergent at a second point, said first point being spaced a first distance from said surface on one side thereof, said second point being spaced a second distance from said surface on the other side thereof, said coherent beam scanner comprising means for carrying said hologram and for moving the carried hologram linearly so as to move the planar surface of the carried hologram along a predetermined plane, a source of a third coherent beam spaced from said predetermined plane to make the fringe pattern of the carried hologram diffract said third coherent beam to converge the diffracted beam along a straight line on the other side of said predetermined plane as the carried hologram moves, and means for receiving the diffracted beam along said straight line.

2. The coherent beam scanner of claim 1 wherein the spacing between said hologram and said means for receiving the diffracted beam is greater than either of said first or second distances.

3. A coherent beam scanner for use in combination with a hologram comprising a hologram recording medium having a planar surface on which a fringe pattern is recorded, said fringe pattern being produced by interference on said surface of a first coherent beam divergent substantially from a first point with a second coherent beam that is coherent with said first coherent beam and convergent at a second point, said first point being spaced a first distance from said surface on one side thereof, said second point being spaced a second distance from said surface on the other side thereof, said coherent beam scanner comprising means for carrying said hologram and for moving the carried hologram linearly so as to move the planar surface of the carried hologram along a predetermined plane, a source of a third coherent beam divergent from a third point spaced a third distance from said predetermined plane on said one side thereof so as to make the fringe pattern of the carried hologram diffract said third coherent beam to converge the diffracted beam along a straight line on the other side of said predetermined plane as the carried hologram moves, and means for receiving the diffracted beam along said straight line, said third distance being smaller than said second distance.

4. The coherent beam scanner of claim 3 wherein the spacing between said hologram and said means for receiving the diffracted beam is greater than either of said first or second distances.

* * * * *